Dec. 8, 1925.  R. VON FROMMER  1,565,126
WEIGHING SCALE
Filed Feb. 28, 1925
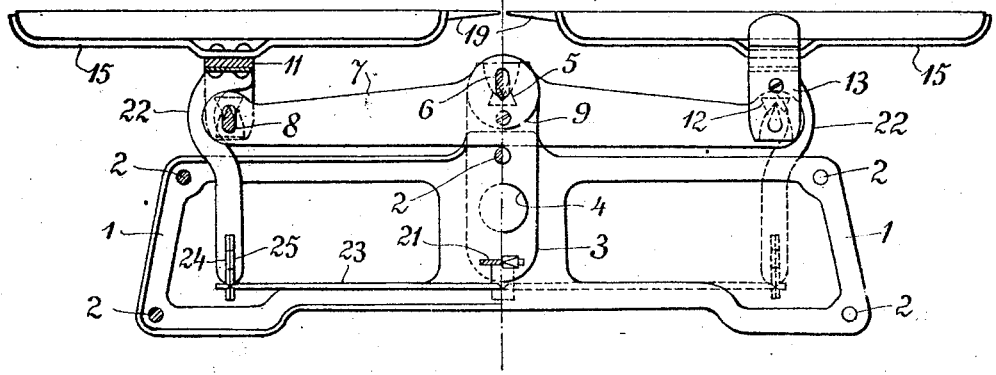
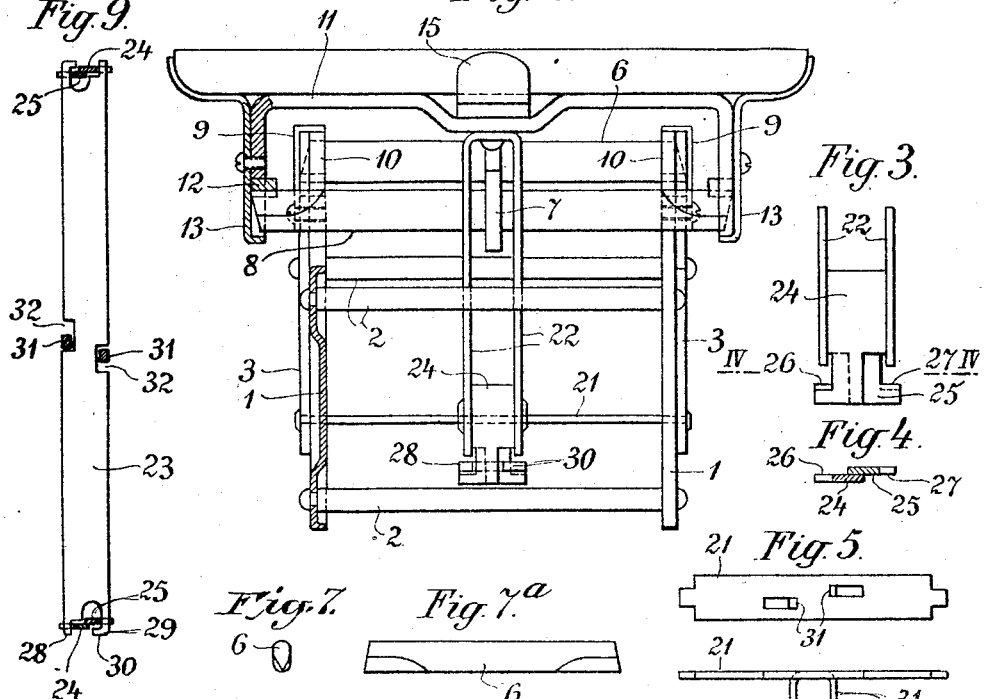
Inventor
R. von Frommer
by Marks & Clerk
Attys.

Patented Dec. 8, 1925.

1,565,126

UNITED STATES PATENT OFFICE.

RUDOLF VON FROMMER, OF BUDAPEST, HUNGARY.

WEIGHING SCALE.

Application filed February 28, 1925. Serial No. 12,390.

*To all whom it may concern:*

Be it known that I, RUDOLF VON FROMMER, a subject of Hungary, residing at 158 Soroksari-ut, Budapest, Hungary, have invented new and useful Improvements in or Relating to Weighing Scales, of which the following is a specification.

This invention relates to weighing-scales of the type having their pans arranged over the scale-beam whereby the latter is caused to form in a known manner one member of a parallelogram.

The invention has for its object to enable the parts of the weighing-scale to be manufactured under the seclusion of cast iron that is brittle material out of sheet-iron or iron-plates by pressing or other similar working methods in such a manner as to produce as far as possible the whole of the scale by means of machinery, whereby the total weight of the scale and the costs of production are reduced to a minimum without the exactness and sensitiveness of the scale being thereby lessened in any way whatever.

In the accompanying drawing one form of the scale according to the invention is illustrated by way of example.

Fig. 1 shows a side elevation of the scale partly in section;

Fig. 2 is a front view;

Fig. 3 shows a detail of the scale in front view;

Fig. 4 is a sectional view of the detail shown in Fig. 3 taken on the line IV—IV of Fig. 3;

Fig. 5 shows a further detail as seen from below, and

Fig. 6 is a side elevation of the same detail.

Figs. 7 and 7ª are end and side views of a bar having balancing-edges located at the middle of the scale-beam, and Figs. 8 and 8ª are end and side views of a bar having balancing edges and located at the ends of the scale-beam.

Fig. 9 is a top view of a further detail of the scale.

The frame of the scale comprises two iron-plates 1 produced by pressing and stiffened by bellying. The said plates 1 are interconnected by means of rods 2.

Each of the two plates 1 is bearing on its outside surface a supporting plate 3 secured to the plates 1 by means of a rod 2 having its ends riveted on the outside surface of the supporting plates 3. At their lower ends the supporting plates are interconnected by means of a connection-bridge 21 also having its ends riveted on the outside surface of the plates. The said supporting-plates are provided with circular cuts 4 in which small plates bearing firm-names, trade marks or other inscriptions may be fastened. The supporting-plates 3 are also provided at their upper ends with disk-shaped strengthening pieces 10 in which the bearings 5 of the balancing-edges of the scale-beam 7 are secured. At the middle of the scale-beam the rod 6 and at the two ends of the same the rods 8 all bearing the balancing edges are rigidly secured. The two rods 8 are adapted to support the pans receiving the load. In order to prevent the rod 6 from performing a longitudinal movement each of the supporting-plates 3 is provided on its outside surface with a stop-plate 9.

Under each of the pan-holders 15 and secured to the same there is arranged a U-shaped girder 11 having a bearing 12 fastened to each of its two ends directed downward, which rest on the balancing edges of the rods 8. A longitudinal movement of the pan-holders 15 is prevented in the same manner as described above in connection with the rod 6 by means of stop-plates 13 arranged at the ends of the girders 11. The fingers 19 are located on the pan-holders and are made integral with the same. Under each of the girders 11 there is arranged a thrust-rod 22 secured to the middle of the same and made of an iron-plate bent in U-shape. The said thrust-rods are also made swan-shaped in order to enable them to avoid the rods 8. The thrust-rods 22 form together with the scale-beam 7 and the connection-rod 23 the well known parallelogram. The ends of the connection-rod 23 have to rest in a well known manner on balancing-edges provided on the thrust-rods 22. For this purpose between the two branches of the thrust-rods 22 there are provided two adjacent plates 24, 25 lying with their surfaces close to each other. The said plates 24, 25 which can also be made integral with the thrust-rods 22 are at their lower ends cut out in order to form one bearing-edge 26, 27 respectively. As may be seen in Fig. 3 one of the edges is bevelled in one direction and the other in the other direction whereby both of the bearing-edges are caused to lie exactly in the same line without necessitating an exact tooling, finishing, or adjustment of the edges. The ends of the connection-rod 23 are provided with projections 28, 29 resting on the bearing-edges 26, 27. One of the said projections is of hook-shape form as may be seen in Fig. 9, whereby disconnection of the connection-rod is prevented. From the connection-bridge 21 of the scale-frame two tongues 31 are pressed out and bent downward which engage in notches 32 of the connection-rod 23 thereby preventing the latter from performing any lateral movement.

The U-shaped girders 11 form together with the hoop-iron 15 the well known cross-shaped pan-holders. In order to secure the pans in the crosswise direction the stop-plates 13 may lie some way underneath of the girders 11 so that it will be unnecessary to exactly adjust these parts. It is understood, however, that the ends of the stop-plates 13 which are bent upwards must lie quite closely on to the pans in order to secure them in their position.

As may be seen from those said above all parts of the scale according to the present invention may be manufactured from iron-sheets or steel-plates by means of pressing and stamping except the rods 6 and 8 bearing the balancing edges and the bearings for these edges so that the manufacture of weighing-scales is made hereby considerably easier and cheaper.

Claims:—

1. In a weighing-scale, the combination with pan holders, of two thrust rods directed downwardly from each of the pan holders respectively and forming the vertical members of a parallelogram, a scale-beam and a connecting rod arranged parallel to said scale beam, forming the horizontal member of said parallelogram, and a plurality of plates on each of said thrust rods having their surfaces abutting and carrying edges on which the two ends of said connecting rods rest, thereby establishing connection between the said thrust rods and said connection rod.

2. In a weighing-scale as claimed in claim 1 the combination with two thrust-rods forming the vertical members of a parallelogram the horizontal members of the same being formed by the scale-beam and a connection-rod of a plate on each of the thrust-rods having an edge formed by bevelling this plate in one direction, and a plate having an edge formed by bevelling this plate in the other direction said two plates lying closely to each other with their surfaces so as to make their edges lie in one and the same line thus forming a rest for the ends of said connection-rod.

3. In a weighing-scale as claimed in claim 1, each of said thrust rods comprising a plate of U-shaped formation.

4. In a weighing-scale the combination with the pan-holders of U-shaped girders, a scale-beam having terminal balancing edges, and bearings for said terminal balancing edges secured in the branches of said U-shaped girders.

5. In a weighing-scale as claimed in claim 1 pan-holders, comprising in combination a U-shaped girder carrying the bearings for the terminal balancing-edges of the scale beam and a piece of hoop-iron arranged crosswise to said U-shaped girder.

6. In a weighing-scale the combination with the pan-holders of U-shaped girders, a scale-beam having terminal balancing edges, bearings for said terminal balancing edges secured in the branches of said U-shaped girders, and stop-plates adapted to prevent said bearings from performing a longitudinal movement on said edges and having prolongations adapted to form together with said girders the pan-holders.

7. In a weighing-scale the combination with the pan-holders of U-shaped girders, a scale-beam having terminal balancing edges, bearings for said terminal balancing edges secured in the branches of said U-shaped girders, and stop-plates adapted to prevent said bearings from performing a longitudinal movement on said edges, and horizontal portions on said stop-plates lying some way underneath of the horizontal portions of said girders.

8. In a weighing-scale as claimed in claim 1 the combination with the pan-holders of fingers made integral with said pan-holders.

9. In a weighing-scale as claimed in claim 1 the combination with the scale-beam of three rods bearing the balancing-edges said edges being provided at the ends of said rods and the body of the rods having a greater cross-area than their ends bearing said edges.

10. In a weighing-scale as claimed in claim 1, the combination with a frame comprising two plates produced by pressing and stamping of a scale-beam, bearings for said scale beam, and strengthening pieces secured to said frame and adapted to receive said bearings for said scale-beam.

11. In a weighing-scale as claimed in claim 1, the combination with a frame comprising two plates produced by pressing and stamping of a scale-beam, bearings for said scale-beam, and supporting-plates secured to said frame plates at the bearings of said scale-beam.

12. In a weighing-scale as claimed in claim 1, the combination with a frame comprising two plates produced by pressing and stamping of a scale-beam, bearings for said scale-beam, and supporting-plates secured to said frame-plates at the bearings of said scale-beam and having openings adapted to receive inscription plates.

13. In a weighing-scale as claimed in claim 1 the combination with a frame comprising two plates produced by pressing and stamping of spacing-rods adapted to stiffen said frame-plates at their corners and under the bearings of the scale-beam.

14. In a weighing-scale as claimed in claim 1 the combination with a frame comprising two plates produced by pressing and stamping of a connection-bridge connecting said two frame-plates, and a connection-rod forming the lower connection member of the parallelogram of the scale said connection-bridge having two projections bent down therefrom adapted to guide said connection-rod.

In testimony whereof I have signed my name to this specification.

RUDOLF V. FROMMER.